(12) United States Patent
Stone

(10) Patent No.: US 6,490,806 B1
(45) Date of Patent: Dec. 10, 2002

(54) CAM SHAFT GEAR POSITIONING SYSTEM

(76) Inventor: Christopher H. Stone, 452 Pine St. Room 404, Manchester, NH (US) 03103

( * ) Notice: Subject to any disclaimer, the term of this patent is extended or adjusted under 35 U.S.C. 154(b) by 64 days.

(21) Appl. No.: 09/721,635

(22) Filed: Nov. 24, 2000

(51) Int. Cl.⁷ .................................................. G01B 5/24
(52) U.S. Cl. ............................ 33/613; 33/655; 409/903
(58) Field of Search ........................... 33/501.7, 501.11, 33/501.14, 501.15, 501.16, 501.19, 520, 533, 600, 613, 645, 655, 660, 661; 409/903

(56) References Cited

U.S. PATENT DOCUMENTS

| | | | | |
|---|---|---|---|---|
| 1,619,483 A | * | 3/1927 | Olson | 33/501.16 |
| 1,906,389 A | * | 5/1933 | McFall | 409/903 |
| 2,855,691 A | * | 10/1958 | Cunningham et al. | 33/501.19 |
| 2,924,884 A | * | 2/1960 | Motz et al. | 33/501.19 |
| 3,020,644 A | * | 2/1962 | Jubelt | 33/501.13 |
| 3,180,032 A | * | 4/1965 | Zuber | 33/501.19 |
| 3,336,789 A | * | 8/1967 | Mayer | 33/501.19 |
| 3,337,964 A | * | 8/1967 | Anthony | 33/501.19 |
| 4,212,111 A | * | 7/1980 | Saari | 33/655 |
| 4,502,233 A | * | 3/1985 | Boitz et al. | 33/645 |
| 5,271,271 A | * | 12/1993 | Frazier | 33/501.16 |
| 5,689,993 A | * | 11/1997 | Matsumoto | 33/501.19 |
| 6,003,236 A | * | 12/1999 | Hoeft | 33/533 |

* cited by examiner

Primary Examiner—G. Bradley Bennett

(57) ABSTRACT

A gear positioning system comprising a first and second gear retention member each has an exterior surface formed with a plurality of recesses. Each of the recesses is similarly configured essentially in the shape of a gear tooth with sidewalls there between. Each of the sidewalls has a central line of symmetry and with the mid-point of the central lines located within the recesses is in an arcuate configuration having a center of curvature of rotation coincident with the center of curvature of a received gear.

7 Claims, 3 Drawing Sheets

CAM SHAFT GEAR POSITIONING SYSTEM

BACKGROUND OF THE INVENTION

1. Field of the Invention

The present invention relates to a cam shaft gear positioning system and more particularly pertains to maintaining a pair of axially offset parallel timing gears in a predetermined rotational orientation with respect to each other during repair and maintenance.

2. Description of the Prior Art

The use of automotive repair and maintenance devices is known in the prior art. More specifically, automotive repair and maintenance devices previously devised and utilized for the purpose of repairing and maintaining vehicles are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, the known devices of the prior art do not describe cam shaft gear positioning system that allows maintaining a pair of axially offset parallel timing gears in a predetermined rotational orientation with respect to each other during repair and maintenance.

In this respect, the cam shaft positioning system according to the present invention substantially departs from the conventional concepts and designs of the prior art, and in doing so provides an apparatus primarily developed for the purpose of maintaining a pair of axially offset parallel timing gears in a predetermined rotational orientation with respect to each other during repair and maintenance.

Therefore, it can be appreciated that there exists a continuing need for a cam shaft positioning system which can be used for maintaining a pair of axially offset parallel timing gears in a predetermined rotational orientation with respect to each other during repair and maintenance. In this regard, the present invention substantially fulfills this need.

SUMMARY OF THE INVENTION

In view of the foregoing disadvantages inherent in the known types of automotive repair and maintenance device now present in the prior art, the present invention provides an improved cam shaft positioning system. As such, the general purpose of the present invention, which will be described subsequently in greater detail, is to provide a cam shaft positioning system and method which has all the advantages of the prior art and none of the disadvantages.

To attain this, the present invention essentially comprises a cam shaft gear positioning system for maintaining a pair of axially offset parallel timing gears in a predetermined rotational orientation with respect to each other during repair and maintenance. The cam shaft gear positioning system comprises of a first gear with a timing mark and peripheral gear teeth mounted on a first shaft for rotation about a first axis of rotation. It further comprises a second gear with a timing mark and peripheral gear teeth mounted on a second shaft for rotation about a second axis of rotation. The first and second axes of rotation are parallel with respect to each other and with the gear teeth of the first and second gears being spaced from each other at a fixed predetermined distance and with the timing marks laterally spaced and in close proximity with respect to each other. It also comprises a first gear retention member that has an exterior surface. The exterior surface is formed with a plurality of longitudinal linear recesses for receiving the gear teeth of the first gear. Each of the recesses is similarly configured essentially in the shape of a gear tooth with an interior root surface and an exterior crest surface and with angled sidewalls there between. Each of the sidewalls has a central line of symmetry equally spaced from the sidewalls with each of the lines of symmetry constituting equally spaced radial lines of the gear to be received thereby and with the mid-points of the portions of the center lines located within the recess line being in an arcuate configuration and having a center of curvature coincident with the center of curvature of the received first gear. It finally comprises a second gear retention member integrally formed with the first gear retention member and has an exterior surface. The exterior surface is formed with a plurality of longitudinal linear recesses for receiving the gear teeth of the second gear. Each of the recesses is similarly configured essentially in the shape of a gear tooth with an interior root surface and an exterior crest surface and with angled sidewalls there between. Each of the sidewalls has a central line of symmetry equally spaced from the sidewalls with each of the lines of symmetry constituting equally spaced radial lines of the gear to be received thereby and with the mid-points of the portions of the center lines located within the recess being in an arcuate configuration and having a center of curvature coincident with the center of curvature of the received gear. The recesses of the first and second gear retention members are rotationally offset with respect to each other.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a cam shaft positioning system which has all of the advantages of the prior art automotive repair and maintenance devices and none of the disadvantages.

It is another object of the present invention to provide a cam shaft positioning system which may be easily and efficiently manufactured and marketed.

It is further object of the present invention to provide a cam shaft positioning system which is of durable and reliable constructions.

An even further object of the present invention is to provide a cam shaft positioning system which is susceptible of a low cost of manufacture with regard to both materials and labor, and which accordingly is then susceptible of low prices of sale to the consuming public, thereby making such cam shaft gear positioning system economically available to the buying public.

Even still another object of the present invention is to provide a cam shaft positioning system for maintaining a pair of axially offset parallel timing gears in a predetermined rotational orientation with respect to each other during repair and maintenance.

Lastly, it is an object of the present invention to provide a gear positioning system comprising a first and second gear retention member each has an exterior surface formed with a plurality of recesses. Each of the recesses is similarly configured essentially in the shape of a gear tooth with sidewalls there between. Each of the sidewalls has a central line of symmetry and with the mid-point of the central lines located within the recesses and in an arcuate configuration having a center of curvature of rotation coincident with the center of curvature of a received gear.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
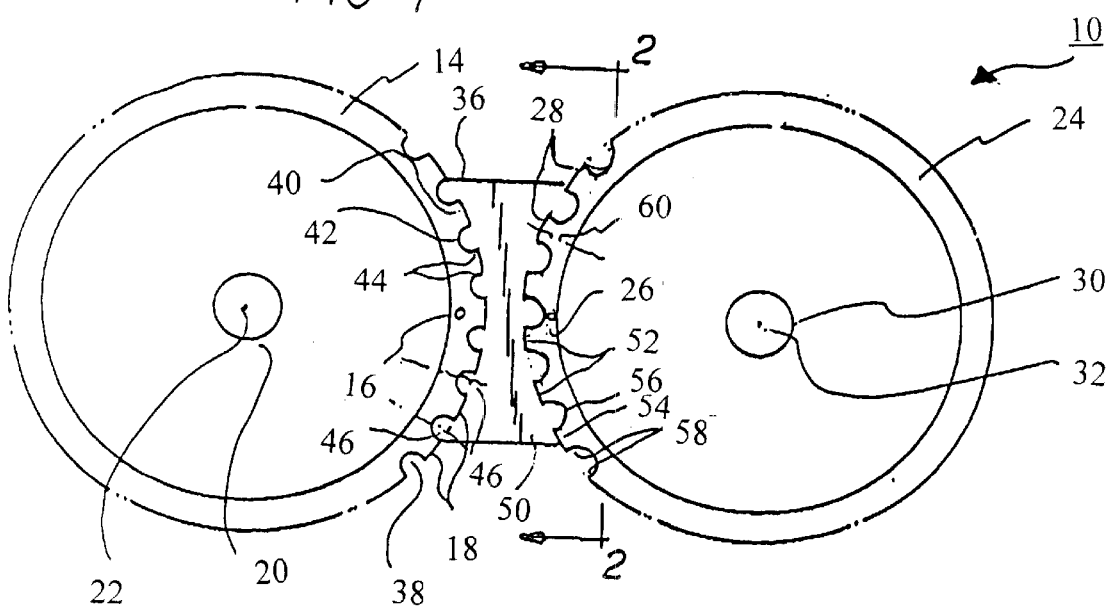
FIG. 1 is a side elevational view of the system constructed in accordance with the primary embodiment of the invention.

With reference now to the drawings, and in particular to FIG. 1 thereof, the preferred embodiment of the cam shaft gear positioning system embodying the principles and concepts of the present invention and generally designated by the reference numeral 10 will be described.

The present invention, the cam shaft gear positioning system 10 is comprised of a plurality of components. Such components in their broadest context include a first gear, a second gear, a first retention member and a second retention member. Such components are individually configured and correlated with respect to each other so as to attain the desired objective.

The cam shaft gear positioning system 10 is for maintaining a pair of axially offset parallel timing gears in a predetermined rotational orientation with respect to each other during repair and maintenance. The cam shaft gear positioning system comprises of a first gear 14 with a timing mark 16 and peripheral gear teeth 18 mounted on a first shaft 20 for rotation about a first axis 22 of rotation.

It further comprises a second gear 24 with a timing mark 26 and peripheral gear teeth 28 mounted on a second shaft 30 for rotation about a second axis 32 of rotation. The first and second axes of rotation are parallel with respect to each other and with the gear teeth of the first and second gears being spaced from each other at a fixed predetermined distance and with the timing marks laterally spaced and in close proximity with respect to each other.

The system also comprises a first gear retention 36 member that has an exterior surface. The exterior surface is formed with a plurality of longitudinal linear recesses 38 for receiving the gear teeth of the first gear. Each of the recesses is similarly configured essentially in the shape of a gear tooth with an interior root surface 40 and an exterior crest surface 42 and with angled sidewalls 44 there between. Each of the sidewalls has a central line of symmetry equally spaced from the sidewalls with each of the lines of symmetry constituting equally spaced radial lines of the gear to be received thereby and with the mid-points 46 of the portions of the center lines located within the recess line being in an arcuate configuration and having a center of curvature coincident with the center of curvature of the received first gear.

The system finally comprises a second gear retention member 50 integrally formed with the first gear retention member and has an exterior surface. The exterior surface is formed with a plurality of longitudinal linear recesses 52 for receiving the gear teeth of the second gear. Each of the recesses is similarly configured essentially in the shape of a gear tooth with an interior root surface 54 and an exterior crest surface 56 and with angled sidewalls 58 there between. Each of the sidewalls has a central line of symmetry equally spaced from the sidewalls with each of the lines of symmetry constituting equally spaced radial lines of the gear to be received thereby and with the mid-points 60 of the portions of the center lines located within the recess being in an arcuate configuration having a center of curvature coincident with the center of curvature of the received gear. The recesses of the first and second gear retention members are rotationally offset with respect to each other.

Figure 2:
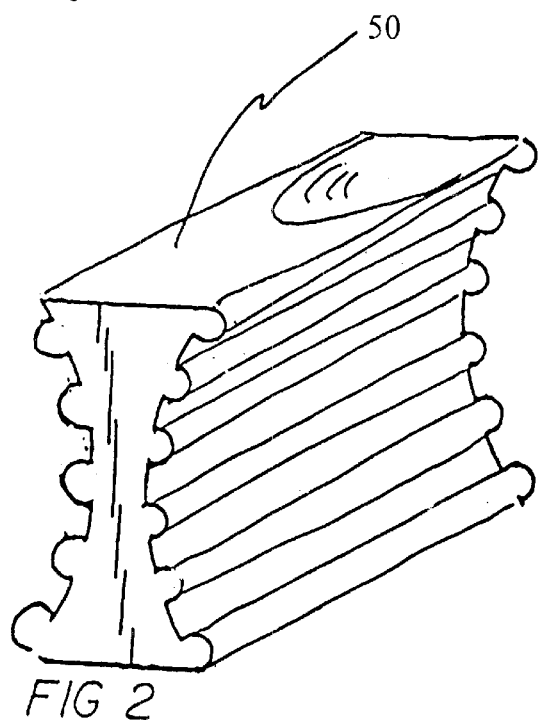
FIG. 2 is a front view taken along line 2—2 of FIG. 1 but in a perspective illustration.

As can be seen in FIG. 2, the upper and lower surfaces of the block formed with the first and second gear retention members is adapted to be held by a user during positioning and removal. To that end, such surfaces are formed with finger receiving recesses to facilitate handling by a user.

Figure 3:
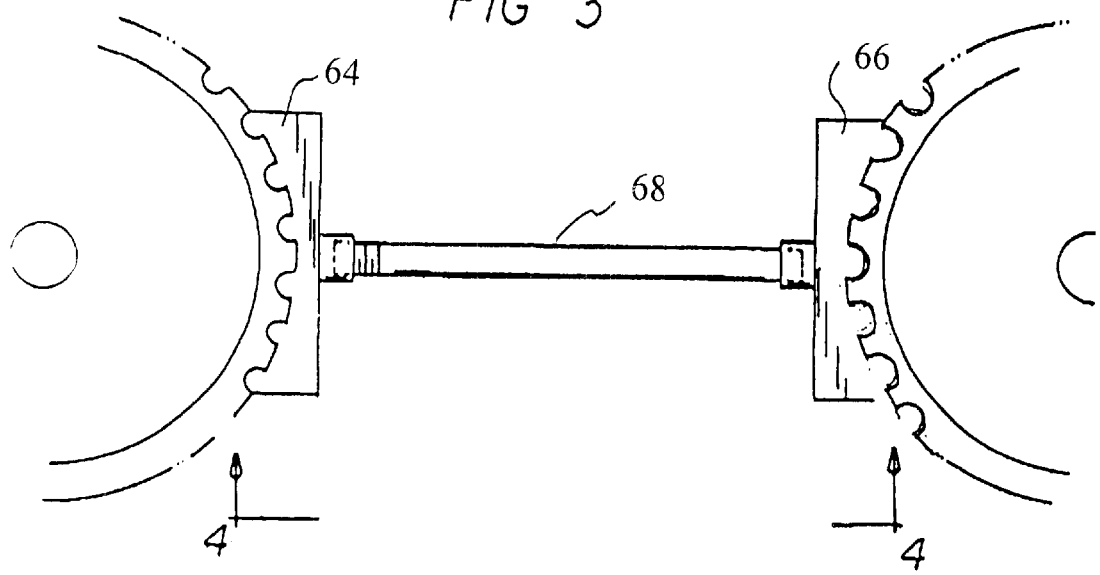
FIG. 3 is a side elevational view of the system constructed in accordance with an alternate embodiment of the invention.
Figure 4:
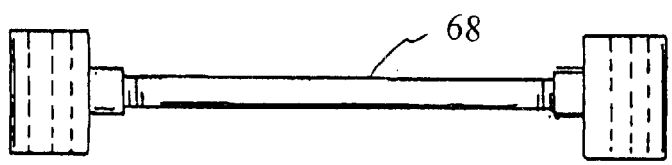
FIG. 4 is a front elevational view taken along line 4—4 of FIG. 3.
Figure 5:
FIG. 5 is a front elevational view another spacer bar for use with the alternate embodiment.

In an alternate embodiment of the invention, as shown in FIGS. 3, 4 and 5, the first and the second gear retention members are formed as separate blocks 64, 66. An intermediate spacer bar 68 is removably coupled there between as by threaded connectors. Additional spacer bars 70 are of different lengths are provided for use as a function of the spacing between the gears for various sized vehicles to be repaired.

Figure 6:
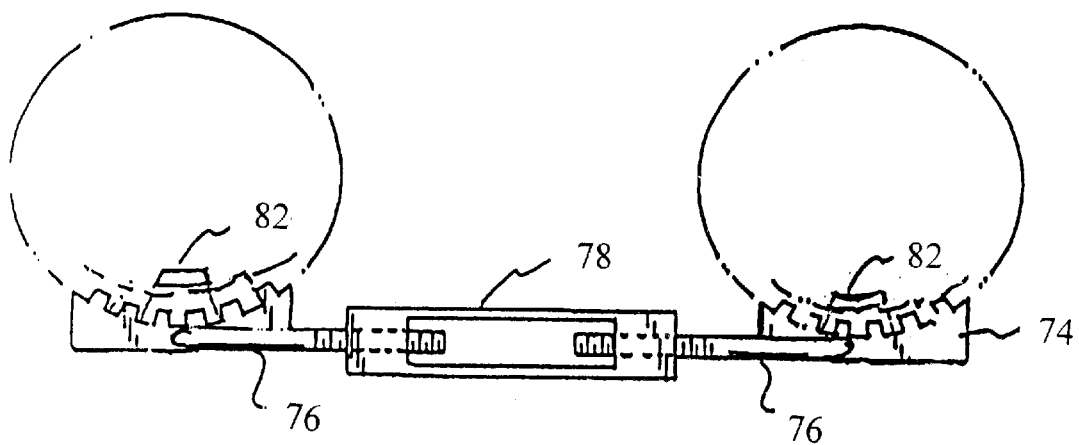
FIG. 6 is a side elevational view of the system constructed in accordance with another alternate embodiment of the invention.
Figure 7:
FIG. 7 is a front elevational view taken along line 4—4 of FIG. 6.
Figure 7:
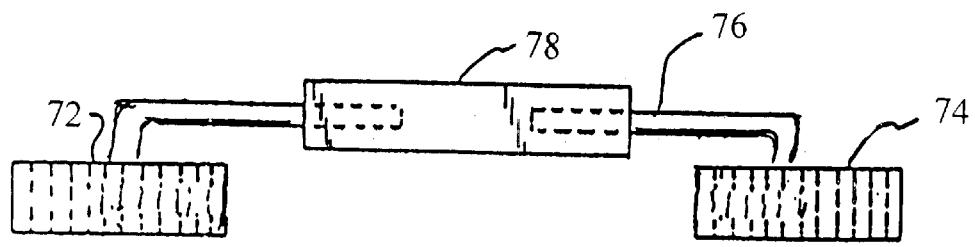

Another alternate embodiment is shown in FIGS. 6 and 7. In such embodiment, the first and second gear retention members 72, 74 are adapted to be positioned on lower extents of gears. A generally U-shaped coupling member 76 is positioned there between coupled to the side faces of the gear retention members. A conventional turn buckle 78 is located at an intermediate location of the coupling member. The turnbuckle functions upon rotation, to vary the spacing between the first and second gear retention members due to the threaded relationship between the several components. It should be understood that the gear retention members of the second embodiment could be held apart by the variable length coupling component of the third embodiment while the plurality of coupling components having various lengths of the second embodiment could be used in the third embodiment instead of the turnbuckle.

As shown in FIGS. 7 and 8, an arcuate backing member 82 is preferably coupled to each gear retention member for receiving the back surface of the gear behind the gear. The backing member is in an arc of a length less than the arc of the recesses of the retention members as for being received between spokes.

In the various embodiments, the gear retention members extend over an arc of between about 60 and 80 degrees. When a backing member is utilized, such backing member preferably extends over an arc of between about 5 and 10 degrees.

The first and second gear retention members are preferably formed of a metallic material, preferably aluminum. In the alternative, they may be fabricated of an elastomeric material, plastic or rubber, natural or synthetic or blends thereof. The connecting members and the turnbuckles are preferably fabricated of steel.

It should be understood that the cross sectional shape of the recesses are configured to correspond to the cross sectional shape of the gears of any particular application. For example if the gear teeth have rounded roots, the crests of the recesses are correspondingly rounded. If the gear teeth have flat crests, the roots of the recesses are correspondingly flat.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cam shaft gear positioning system for maintaining a pair of axially offset parallel timing gears in a predetermined rotational orientation with respect to each other during repair and maintenance comprising, in combination:

a first gear-with a timing mark and peripheral gear teeth mounted on a first shaft for rotation about a first axis of rotation;

a second gear with a timing mark and peripheral gear teeth mounted on a second shaft for rotation about a second axis of rotation, the first and second axes of rotation being parallel with respect to each other and with the gear teeth of the first and second gears being spaced from each other at a fixed predetermined distance and with the timing marks laterally spaced and in close proximity with respect to each other;

a first gear retention member having an exterior surface, the exterior surface being formed with a plurality of longitudinal linear recesses for receiving the gear teeth of the first gear, each of the recesses being similarly configured essentially in the shape of a gear tooth with an interior root surface and an exterior crest surface and with angled sidewalls there between, each of the sidewalls having a central line of symmetry equally spaced from the sidewalls with each of the lines of symmetry constituting equally spaced radial lines of the gear to be received thereby and with the mid-points of the portions of the center lines located within the recess line being in an arcuate configuration and having a center of curvature coincident with the center of curvature of the received first gear; and a second gear retention member integrally formed with the first gear retention member and having an exterior surface, the exterior surface being formed with a plurality of longitudinal linear recesses for receiving the gear teeth of the second gear, each of the recesses being similarly configured essentially in the shape of a gear tooth with an interior root surface and an exterior crest surface and with angled sidewalls there between, each of the sidewalls having a central line of symmetry equally spaced from the sidewalls with each of the lines of symmetry constituting equally spaced radial lines of the gear to be received thereby and with the mid-points of the portions of the center lines located within the recess being in an arcuate configuration and having a center of curvature coincident with the center of curvature of the received gear, the recesses of the first and second gear retention members being rotationally offset with respect to each other.

2. A gear positioning system comprising:

a first and second gear retention member each having an exterior surface formed with a plurality of recesses, each of the recesses being similarly configured essentially in the shape of a gear tooth with sidewalls there between, each of the sidewalls having a central line of symmetry and with the mid-point of the central lines located within the recesses being in an arcuate configuration having a center of curvature of rotation coincident with the center of curvature of a received gear.

3. The gear positioning system as set forth in claim 2 wherein the first and second gear retention members are formed as a unitary block fabricated of a metallic material, preferably aluminum.

4. The gear positioning system as set forth in claim 2 wherein the firsthand the second gear retention members are formed as separate blocks with an intermediate spacer bar removably coupled there between.

5. The gear positioning system as set forth in claim 2 wherein the first and second gear retention members are fabricated of an elastomeric material, plastic or rubber, natural or synthetic or blends thereof.

6. The gear positioning system as set forth in claim 2 wherein the first and second gear retention members are adapted to be positioned on lower extents of gears with a generally U-shaped coupling member there between and with a turn buckle to vary the spacing between the first and second gear retention members.

7. The gear positioning system as set forth in claim 2 an further including an arcuate backing member coupled to each gear retention member for receiving the back face of the gear behind the gear teeth, the backing member being in an arc of a length less than the arc of the recesses of the retention members.

* * * * *